US006230774B1

(12) United States Patent
Ward

(10) Patent No.: US 6,230,774 B1
(45) Date of Patent: May 15, 2001

(54) TRANSFER PRESS APPARATUS

(75) Inventor: Phillip D. Ward, Pittsburg, KS (US)

(73) Assignee: Hix Corporation, Pittsburg, KS (US)

( * ) Notice: Subject to any disclaimer, the term of this patent is extended or adjusted under 35 U.S.C. 154(b) by 0 days.

(21) Appl. No.: 09/372,530

(22) Filed: Aug. 11, 1999

(51) Int. Cl.$^{7}$ .................................................. B32B 31/00

(52) U.S. Cl. ..................... 156/359; 156/579; 156/583.3

(58) Field of Search .................................. 156/359, 581, 156/583.1, 583.6, 583.8, 583.9, 367, 379.9, 379.6, 380.2, 368, 579

(56) References Cited

U.S. PATENT DOCUMENTS

| | | | |
|---|---|---|---|
| 4,874,454 | 10/1989 | Talalay et al. . | |
| 5,019,193 | 5/1991 | Aramini . | |
| 5,244,529 | 9/1993 | Siegel . | |
| 5,366,580 * | 11/1994 | Czach | 156/359 |
| 5,408,071 * | 4/1995 | Ragland et al. | 219/530 |
| 5,540,802 * | 7/1996 | Totani | 156/359 |
| 5,584,961 * | 12/1996 | Ellsworth et al. | 156/481 |

* cited by examiner

*Primary Examiner*—James Sells
(74) *Attorney, Agent, or Firm*—Shook, Hardy & Bacon L.L.P.

(57) ABSTRACT

A transfer press apparatus is provided which includes, among other features, a frame, a cuff assembly supported on the frame and including a support formed of a heat-conductive material with radially opposed inner and outer surfaces and a heating element disposed on the outer surface of the support, and an actuating assembly for positioning the cuff assembly from an engaged to a disengaged position.

14 Claims, 3 Drawing Sheets

TRANSFER PRESS APPARATUS

BACKGROUND OF THE INVENTION

The present invention relates generally to a press apparatus for use in applying a heat transfer to a mug, cup, or similar cylindrical substrate, and more particularly to a transfer press apparatus having a flexible cuff assembly for applying pressure and heat to the substrate to accomplish application of the transfer.

It is conventional to provide a transfer press apparatus having a flexible cuff assembly movable from an engaged to a disengaged position, such that in the engaged position the cuff assembly applies an adjustable pressure and heat to a cylindrical substrate such as a mug, cup, or the like. The conventional transfer press utilizes an actuation assembly to apply the pressure and heat to the substrate. When the actuating assembly is activated, the cuff assembly is moved to the engaged position. In the engaged position, the heating element is pressed against the substrate by an outer portion of the cuff assembly. The outer portion of the cuff assembly provides the pressure required to transfer the image to the substrate and keeps the heating element flush against the surface of the substrate.

Although the conventional construction is effective for transferring an image to a substrate, the integrity and eventual failure of the heating element is the result of repeated compression being applied to the heating element. Failure of the heating element is a known problem associated with this type of transfer press apparatus. Therefore, a cuff assembly is needed that will overcome the problems associated with conventional cuff assemblies.

BRIEF SUMMARY OF THE INVENTION

It is an object of the present invention to solve the technical problems left unaddressed by the prior art, and to provide a transfer press apparatus that utilizes a cuff assembly construction that will assist in maintaining the structural integrity of a heating element for periods of time that exceed those of conventional transfer presses.

In accordance with this and other objects evident from the following description of the preferred embodiment of the invention, a transfer press apparatus is provided which includes, among other features, a frame, a cuff assembly supported on the frame and including a support formed of a heat conductive material with radially opposed inner and outer surfaces and a heating element disposed on the outer surface of the support, and an actuating assembly for positioning the cuff assembly from an engaged to a disengaged position.

By providing the construction in accordance with the present invention, numerous advantages are realized. For example, by providing a transfer press wherein the cuff assembly is designed so that the heating element is on an outside surface of a support, the heating element is supported in tension against the outer surface of the support rather than repeatedly being compressed between the support and the substrate. Further, by providing the cuff assembly of the present invention, it is possible to increase the useful life of the heating element and cuff assembly of the present invention.

BRIEF DESCRIPTION OF THE SEVERAL VIEWS OF THE DRAWING

The preferred embodiment of the present invention is described in detail below with reference to the attached drawing wherein.

DETAILED DESCRIPTION OF THE INVENTION

Figure 1:
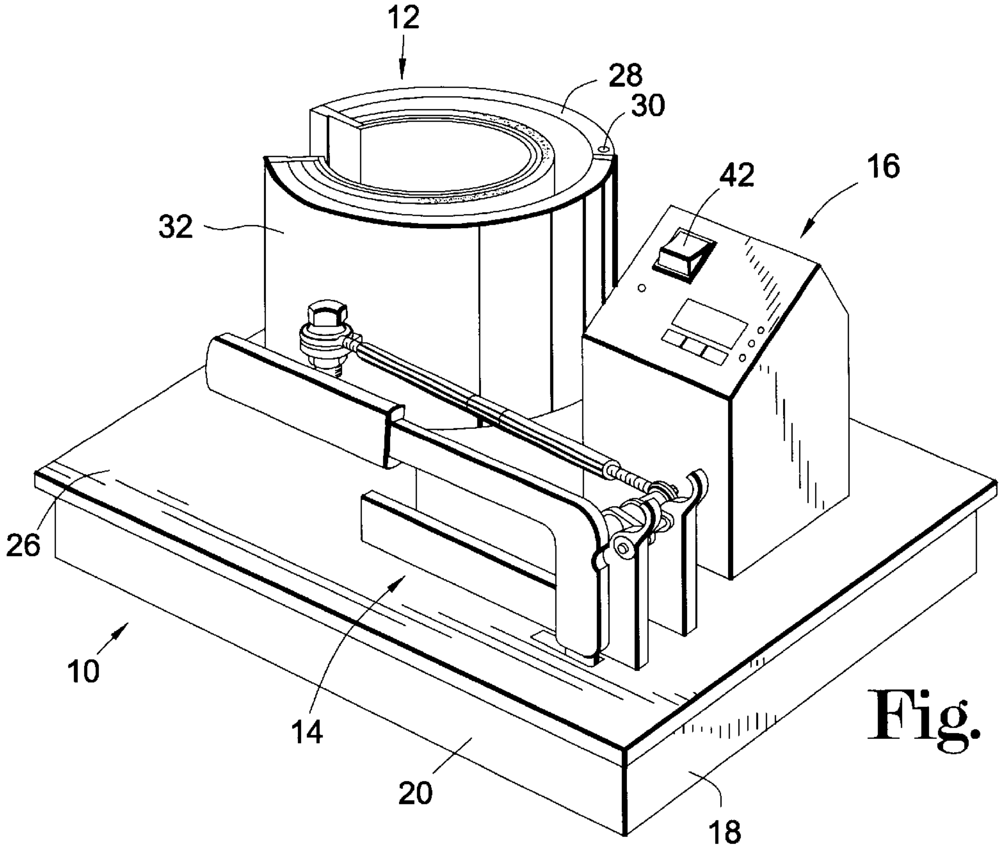
FIG. 1 is a perspective view of a transfer press apparatus constructed in accordance with the preferred embodiment of the present invention.

A transfer press apparatus constructed in accordance with the preferred embodiment of the present invention is illustrated in FIG. 1, and broadly includes a frame 10, a cuff assembly 12, an actuation assembly 14, and a control assembly 16. Frame 10 supports the cuff assembly 12, the actuation assembly 14, and control assembly 16. Generally, the actuation assembly 14 is coupled with frame 10 for actuating cuff assembly 12 from a disengaged to an engaged position.

Figure 2:
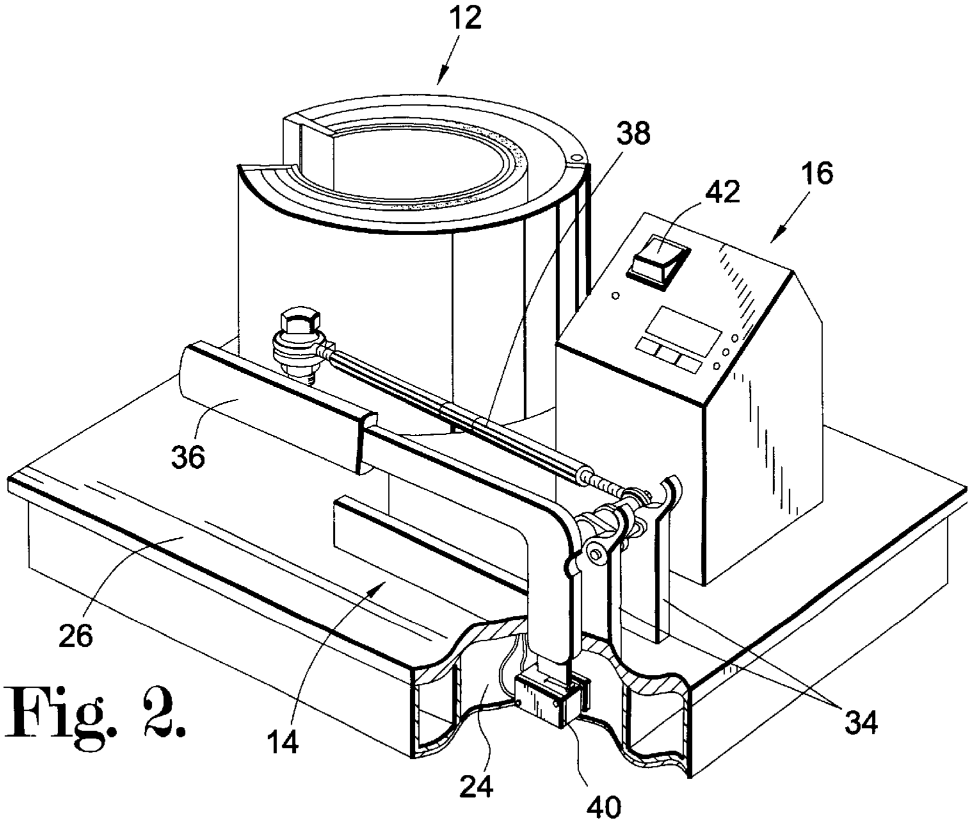
FIG. 2 is a fragmentary perspective view of the apparatus, illustrating an actuation assembly forming a part thereof.

As best illustrated in FIGS. 1 and 2, frame 10 is defined by a pair of sidewalls 18 that are spaced from one another and secured in place by two longitudinally opposed end walls 20. Side walls 18 can be formed of any material and in any shape that will facilitate the objects of the present invention. In the preferred embodiment, these walls are preferably laser cut from steel plates, and are shaped for engagement with one another in such a manner that will reduce the number of fasteners required to assemble frame 10. In the preferred embodiment, side walls 18 and end walls 20 are hollow and generally square-shaped having a lower and an upper portion. Each of the end walls 20 has an end covering adapted to be received within the generally square-shaped opening. The lower portion includes a bottom edge adapted to engage a bottom cover 24 and the upper portion includes an upper edge adapted to receive a support surface 26.

In the preferred embodiment, both support surface 26 and the bottom cover 24 are formed of sheet metal. Preferably, the sheet metal has been laser cut to the required size. Support surface 26 includes laser cut openings adapted to receive elements of the present invention, such as actuation assembly 14, control interface assembly 16, and a first cuff support 28. The bottom cover 24 is coupled to side walls 18 and end walls 20. In the preferred embodiment, bottom cover 24 presents a hole in each of the four comers in which a conventional fastener is received for coupling bottom cover 24 with the bottom edge of side and end walls 18, 20. Bottom cover 24 further presents a hole in which a conventional fastener is received for fixing internal components of the transfer press apparatus. Support surface 26 is coupled with the upper portion of side and end walls 18, 20. Support surface 26 presents slots therethrough for receipt of tabs extending downwardly in the first cuff support 28 for receipt therein to couple first cuff support 28 to support surface 26. Each of the slots presented by support surface 26 are preferably laser cut.

First cuff support 28 can be any shape designed to support the cuff. In the preferred embodiment, first cuff support 28 is shaped in a semi-cylinder extending upward from support surface 26. In addition to the tabs designed for receipt in support surface 26, first cuff support 28 presents an upper and a lower circumferential tab. Each of these tabs further present openings 30 therethrough designed for receiving a hinge pin or shaft. The hinge pin is designed to couple a second cuff support 32 in a hingeable relationship with first cuff support 28 so that cuff assembly 12 can pivot between an engaged and disengaged position. First cuff support 28 has a free end opposite the end presenting the upper and lower circumferential tab.

Second cuff support 32 can be any shape designed to facilitate supporting the cuff assembly 12. In the preferred embodiment, the cuff support 32 is roughly semicylindrical and extends up from the support surface 26. The second cuff support 32 presents two circumferential tabs. These tabs further present openings therethrough designed for receipt of a hinge pin or a shaft. The parallel extending tabs on second cuff support 32 are adapted to be positioned in a working relationship with the circumferential tabs on the first support so that a hinge pin or shaft can be inserted through the openings on the circumferential tabs presented by first and second cuff supports so that they are hingedly coupled together by a hinge pin or shaft. While the hinge coupling between the first and second cuff supports 28, 32 is the preferred embodiment, one skilled in the art could easily design the first and second cuff supports such that they are hingedly coupled together for movement between an engaged and a disengaged position. Second cuff support 32 further presents a free end opposite the end presenting the two circumferential tabs.

Figure 5:
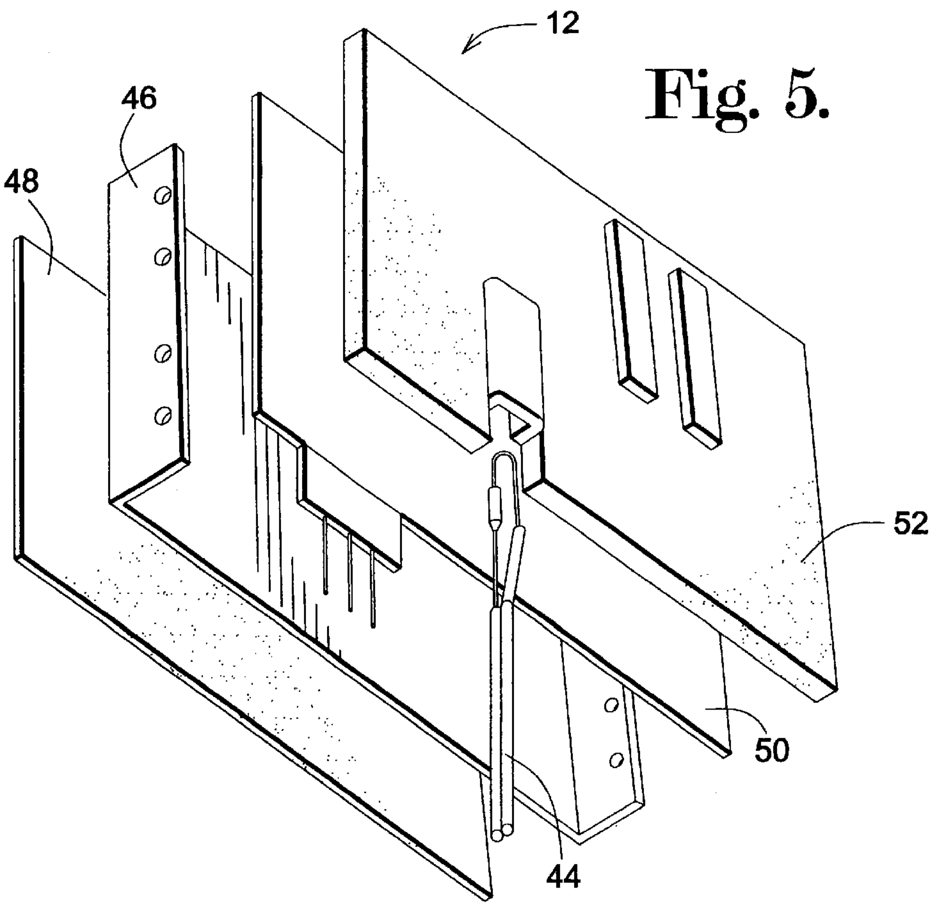
FIG. 5 is an exploded perspective view of the cuff assembly.

As seen in FIG. 5, cuff assembly 12 includes a support sheet 46, a first silicone rubber sponge liner 48, a heating element 50, and a second silicone rubber sponge insulator 52. Support sheet 46 extends upward from support surface 26 parallel with first and second cuff supports 28, 32. Support sheet 46 is removably coupled to cuff supports 28, 32 by conventional fasteners at the free ends presented by the first and second cuff supports, as seen in FIGS. 1, 2, 3 and 6. In the preferred embodiment, the fasteners are screws. Support sheet 46 is formed of a heat conductive material and has a radially opposed inner and outer surface. The inner surface of support sheet 46 is coupled with a first silicone rubber sponge liner 48 which, when in the engaged position, directly contacts the substrate receiving the heat transfer image. The outer surface of support sheet 46 has a heating element 50 having an outer surface coupled thereto. The outer surface of heating element 50 is coupled to a second silicone rubber sponge insulator 52, such that the cuff assembly, from inside to outside, comprises a silicone rubber sponge liner 48, a support sheet 46, a heating element 50, and a second rubber sponge insulator 52.

Heating element 50 is a standard resistance heating element including one or more conductive bands that generate heat when carrying a current. As current increases, so does the temperature.

Cuff assembly 12 preferably includes an over-temperature heat-sensitive fuse 44. The over-temperature fuse 44 is removably seated between heating element 50 and second silicone rubber sponge insulator 52. The over-temperature fuse 44 reduces damage to heating element 50 by breaking the circuit to the heating element when the temperature reaches a predetermined point. The over-temperature fuse is easily replaceable by removing cuff assembly 12 from the first and second cuff supports and replacing the over-temperature fuse 44.

FIGS. 1–4 and 6 illustrate an actuation assembly 14. Actuation assembly 14 comprises a stand 34, a handle 36, a turnbuckle 38, and an actuation switch 40. Stand 34 comprises a pair of parallel L-shaped structures. Those structures are coupled to support surface 26 through tabs on the longer portion of the pair of L-shaped structures. These tabs are received into slots formed through support surface 26. These slots are preferably laser cut into support surface 26 such that the tabs and slots do not require conventional fastening means. The two L-shaped structures are separated by a distance sufficient to provide support for handle 36 on an upper portion of the parallel L-shaped structures. Handle 36 is pivotally coupled to the upper portion of the L-shaped structure. Handle 36 is L-shaped with a first, longer portion extending parallel to support surface 26 and a second portion perpendicular with the support surface such that, when handle 36 is in an engaged position, the second portion of the handle extends below the plane formed by support surface 26.

A cam is coupled to handle 36 where the first portion and the second portion of handle 36 meet. The cam has two parallel prongs extending therefrom. At an end away from the cam, the prongs present openings therethrough. The prongs are spaced apart at a distance sufficient to snugly fit between the upper portion of stand 34. A pin then extends through openings presented by the upper portion of the stand and the openings in the prongs extending from the cam thereby allowing handle 36 to be hingedly coupled to stand 34.

Figure 3:
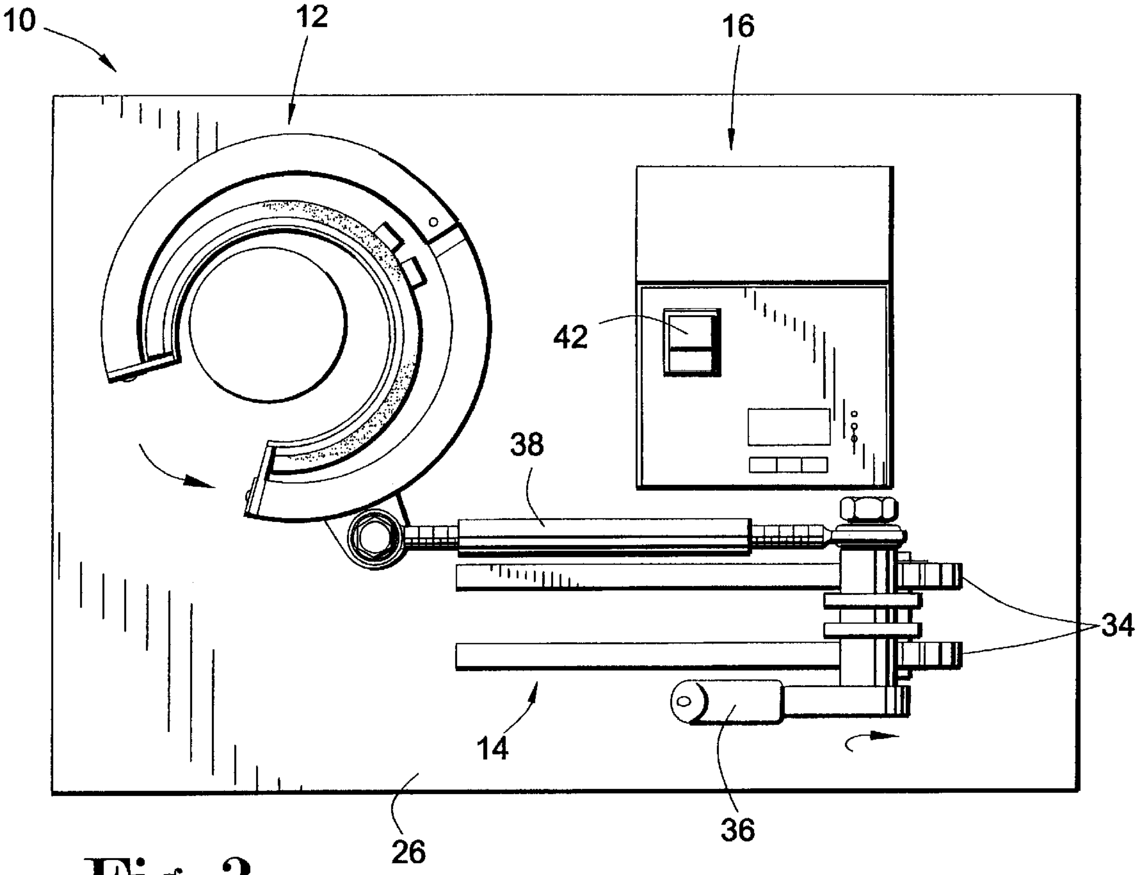
FIG. 3 is a top elevational view of the transfer press, illustrating a cuff assembly forming a part thereof in a disengaged position.

As seen in FIG. 3, the cam is coupled an turnbuckle 38 opposite handle 36. Turnbuckle 38 extends from the cam at one end to the second cuff support 32 at the other. Cuff support 32 presents a tab extending outward therefrom for adjustably coupling turnbuckle 38 thereto. In the preferred embodiment, the tab defines an opening through such that a conventional attachment means adjustably attaches turnbuckle 38 to second cuff support 32.

Turnbuckle 38 includes a sleeve and a pair of threaded rods. The sleeve is internally threaded at each end so that when rotated, the rods are moved axially toward or away from one another thereby allowing adjustments in the length of the turnbuckle 38. By adjusting the length of the turnbuckle, the transfer press can be adjusted to act on varying sized substrates. For example, if the substrate is a coffee mug with a diameter of approximately three inches, turnbuckle 38 is adjusted until sufficient pressure is exerted by the first and second cuff supports 28, 32, which in turn tightens the cuff assembly around the mug. If the next substrate or mug has a diameter of four inches, turnbuckle 38 is adjusted until the cuff assembly snugly fits around that size substrate.

Figure 4:
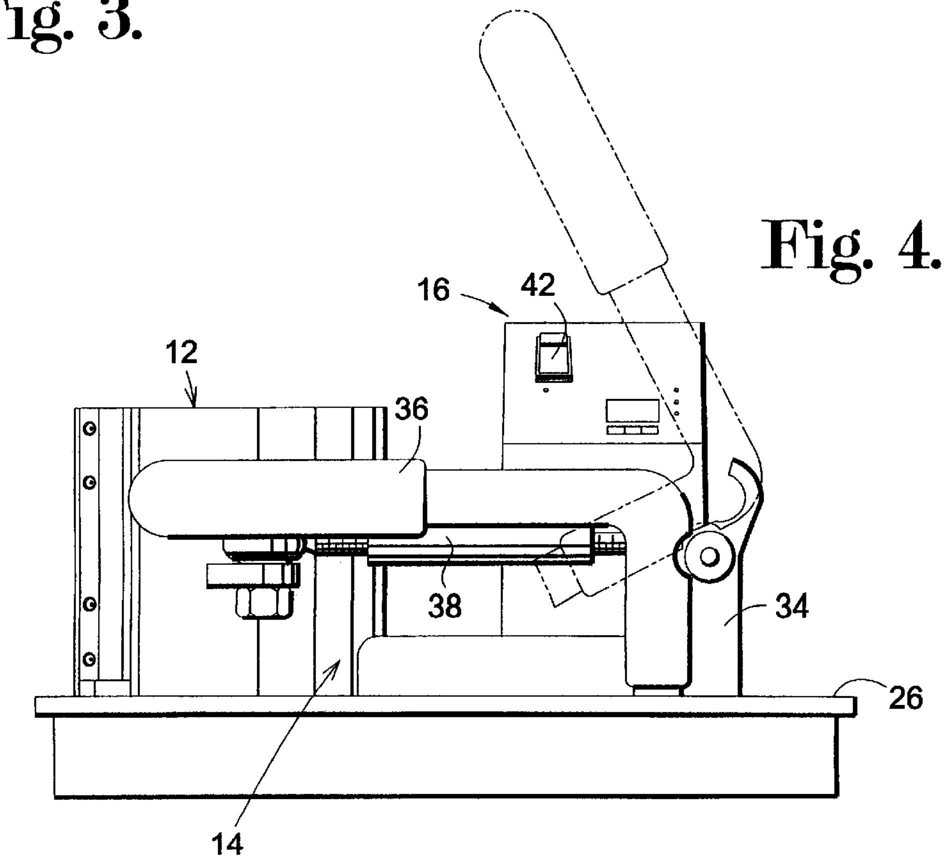
FIG. 4 is a side view of the transfer press apparatus.
Figure 6:
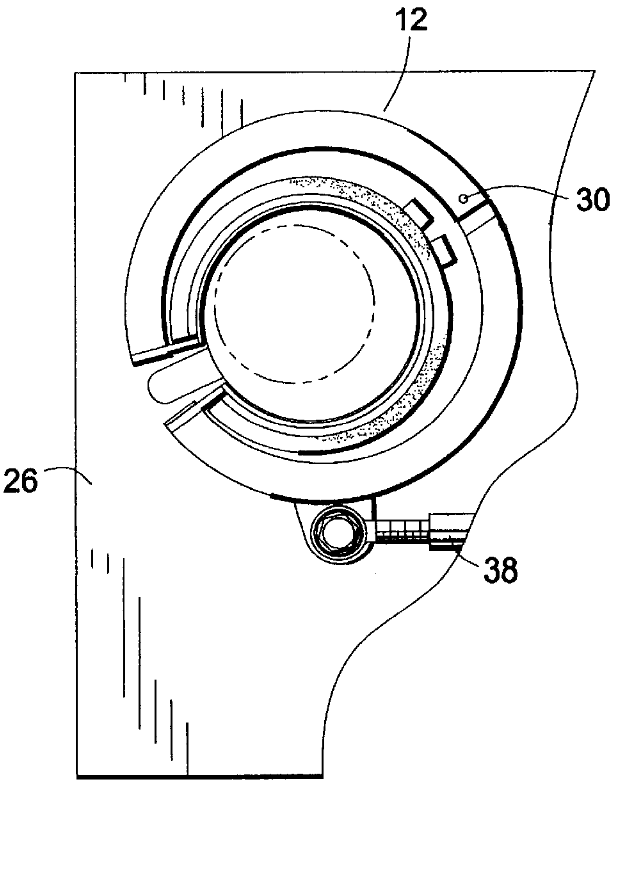
FIG. 6 is a fragmentary top plan view of the transfer press, illustrating the cuff assembly in an engaged position.

As illustrated in FIG. 2, actuation assembly 14 further includes an actuation switch 40 coupled with bottom cover 24. Support surface 26 presents an opening directly above actuation switch 40. The opening in support surface 26 is adapted to receive the second portion of handle 36 when handle 36 is in the engaged position such that the end of the second portion of the handle activates the actuation switch. When handle 36 is in the disengaged position, switch 40 is not activated. Activation switch 40 allows the activation of the heating element 50. The positionings of handle 36 are best illustrated by FIG. 4. In addition to activating actuation switch 40, handle 36 positions second cuff support 32 to an engaged position such that, when a substrate is present between first and second cuff supports 28, 32, cuff assembly 12 is snugly positioned around the substrate, as illustrated by FIG. 6.

As illustrated in FIGS. 1–4, control assembly 16 extends upward from support surface 26 to provide an interface, and further includes an electrical connection to the heating element 50 through the over-temperature fuse 44, a power source, and the activation switch. Control assembly 16 includes an upper surface presenting an interface with a power switch 42 and other necessary user interface information. In the preferred embodiment, the upper surface includes a "heater on" indication, a digital readout for setting print temperature, print time, and idle offset temperature.

In operation, a substrate such as a mug, cup, or the like, is placed between the first and second cuff while handle 36 is positioned in the disengaged position. Prior to placing the substrate between first and second cuff supports 28, 32, an image is positioned on the substrate in the desired orientation. After the image has been positioned on the substrate, a user will turn on power switch 42 located on the upper surface of control assembly 16. After the power switch has been turned on, the user will select the print temperature, print time, and idle offset temperature. Once the temperature has stabilized, the user will place the substrate with the image attached into the cuff assembly and move handle 36 from the disengaged position to the engaged position which will cause activation of actuation switch 40. When handle 26 engages actuation switch 40, the idle temperature (if set) will raise to the preselected print temperature, and the time (displaying the print time selected) will begin counting down. Additionally, the moving of handle 36 from the disengaged to the engaged position causes turnbuckle 38 to move second cuff support 32 to an engaged position where cuff assembly 12 is snugly pressed against the substrate. Upon completion of the print time and temperature cycle, the handle can then be moved from the engaged to the disengaged position thereby shutting off actuation switch 40 and releasing the pressure from cuff assembly 12 on the substrate. The substrate can then be removed and a new substrate placed into position on the transfer press apparatus. Additionally, during operation, if heating element 50 reaches a preset temperature, over-temperature fuse 44 will break the connection to heating element 50 thereby preventing current from passing through heating element 50.

Although the present invention has been described with reference to the preferred embodiment illustrated in the figures of the drawing, it is noted that substitutions may be made and equivalents employed herein without departing from the scope of the invention as recited in the claims.

I claim:

1. A transfer press apparatus for applying a heat transfer to a substrate, the apparatus comprising:

a frame;

a cuff assembly supported on the frame and including a support formed of a heat conductive material with radially opposed inner and outer surfaces and a heating element disposed on the outer surface of the support; and an actuation assembly for positioning the cuff assembly from an engaged to a disengaged position, wherein the heating element is supported in tension on the outer surface of the support sheet opposite the substrate when the actuation assembly is in the engaged position.

2. The transfer press of claim 1 further comprising a CPU adapted for controlling the heating element.

3. The transfer press of claim 2 wherein the actuation assembly completes a circuit to the CPU.

4. The transfer press of claim 1 wherein the cuff assembly further comprises a silicone rubber sponge insulator.

5. The transfer press of claim 4 wherein the cuff assembly is adapted for receiving a heat-sensitive replaceable fuse.

6. The transfer press of claim 1 wherein the heating element includes a NI-Chrome wire encased in silicone rubber.

7. The transfer press of claim 3 wherein the CPU controls an idle temperature, a print temperature and a print time function.

8. A transfer press apparatus for applying a heat transfer to a substrate, the apparatus comprising:

a frame;

a cuff assembly supported on the frame and including a support formed of a heat conductive material with radially opposed inner and outer surfaces and a heating element disposed on the outer surface of the support;

an actuation assembly for positioning the cuff assembly from an engaged to a disengaged position; and means for supporting the heating element in tension on the outer surface of the support sheet opposite the substrate when the actuation assembly is in the engaged position.

9. The transfer press of claim 8 further comprising a CPU adapted for controlling the heating element.

10. The transfer press of claim 9 wherein the actuation assembly completes a circuit to the CPU.

11. The transfer press of claim 8 wherein the cuff assembly further comprises a silicone rubber sponge insulator.

12. The transfer press of claim 11 wherein the cuff assembly is adapted for receiving a heat-sensitive replaceable fuse.

13. The transfer press of claim 8 wherein the heating element includes a NI-Chrome wire encased in silicone rubber.

14. The transfer press of claim 10 wherein the CPU controls an idle temperature, a print temperature and a print time function.

* * * * *